US009237277B1

(12) United States Patent
Gulliver

(10) Patent No.: US 9,237,277 B1
(45) Date of Patent: Jan. 12, 2016

(54) ACCURATE SIMULATION OF SHALLOW DEPTH OF FIELD USING CONTRAST DETECTION

(71) Applicant: Google Inc., Mountain View, CA (US)

(72) Inventor: Ian Ashleigh Gulliver, Santa Clara, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

(21) Appl. No.: 14/298,815

(22) Filed: Jun. 6, 2014

(51) Int. Cl.
H04N 5/262 (2006.01)

(52) U.S. Cl.
CPC .................................. H04N 5/262 (2013.01)

(58) Field of Classification Search
CPC ... H04N 5/262; H04N 5/2621; H04N 5/2622; H04N 1/409; H04N 1/4092; H04N 1/58; H04N 5/2356; H04N 5/235; H04N 5/243; H04N 5/145; G03B 7/28; G03B 3/00; G03B 13/32; G03B 13/30; G02B 7/36; G02B 7/365; G06T 5/002; G06T 5/003
See application file for complete search history.

(56) References Cited

U.S. PATENT DOCUMENTS

| 8,665,349 | B2 | 3/2014 | Lin |
| 8,928,772 | B2 * | 1/2015 | Pillman et al. ............. 348/222.1 |
| 2002/0140823 | A1 * | 10/2002 | Sakurai et al. ............ 348/207.99 |
| 2005/0195317 | A1 * | 9/2005 | Myoga ......................... 348/370 |
| 2009/0096897 | A1 * | 4/2009 | Saito ............................. 348/241 |
| 2009/0300553 | A1 * | 12/2009 | Pettigrew et al. ............. 715/856 |
| 2009/0316009 | A1 * | 12/2009 | Ito et al. ..................... 348/208.4 |
| 2010/0061642 | A1 * | 3/2010 | Kondo et al. ................. 382/224 |
| 2010/0272356 | A1 * | 10/2010 | Hong ............................ 382/170 |
| 2011/0150349 | A1 * | 6/2011 | Kojima et al. ................ 382/224 |
| 2011/0280475 | A1 * | 11/2011 | Singhal ................ H04N 5/2621 382/162 |

(Continued)

FOREIGN PATENT DOCUMENTS

WO     2012/170949 A3    12/2012

OTHER PUBLICATIONS

Handong Zhao, Jingiing Chen, Yahong Han, Xiaochan Cao; "Image aesthetics enhancement using composition-based saliency;" Tianjin Univ., Institute of Information Engineering, Chinese Academy of Sciences, Apr. 2014, 5 pgs., China; http:/link.springer.com/article/10.1007/s00530-014-0373-1.

(Continued)

Primary Examiner — Aung S Moe
(74) Attorney, Agent, or Firm — McDermott Will & Emery LLP

(57) ABSTRACT

Aspects of the subject technology relate to accurately simulating a shallow depth of field (DOF) in an image through post-processing, such as using contrast detection. The highest contrast value in the image is used to determine high contrast areas and low contrast areas. The boundaries or edges of the high contrast areas are determined from contrast values in the image. A blur is applied to the low contrast areas, which stops abruptly at the edges. Blurring the low contrast areas simulates the shallow DOF by mimicking the blur in out-of-focus areas when taking photos with a camera and lens system having a shallow DOF.

20 Claims, 6 Drawing Sheets

(56) References Cited

U.S. PATENT DOCUMENTS

| | | | |
|---|---|---|---|
| 2012/0007939 A1* | 1/2012 | Michrowski et al. | 348/14.07 |
| 2012/0320239 A1* | 12/2012 | Uehara | 348/239 |
| 2013/0129233 A1* | 5/2013 | Schiller et al. | 382/228 |
| 2013/0230259 A1* | 9/2013 | Intwala et al. | 382/255 |
| 2014/0086486 A1* | 3/2014 | Pillman et al. | 382/173 |
| 2014/0152886 A1* | 6/2014 | Morgan-Mar et al. | 348/349 |
| 2014/0176768 A1* | 6/2014 | Sato et al. | 348/241 |
| 2014/0218550 A1* | 8/2014 | Chuang et al. | 348/208.6 |
| 2014/0341425 A1* | 11/2014 | Babacan et al. | 382/103 |
| 2015/0062384 A1* | 3/2015 | Tanaka | G06T 5/004 348/240.2 |

OTHER PUBLICATIONS

Li Xu, Cewu Lu, Yi Xu Jiaya Jia; "Image smoothing via L0 gradient minimization;" The Chinese University of Hong Kong; Dec. 2011, 11 pgs., Hong Kong; http://www.cs.toronto.edu/~kyros/course/2530/papers/Lecture-06/Xu2011.pdf.

Yu-Wing Tai, Michael S. Brown; "Single Image Defocus Map Estimation Using Local Contrast Prior;" Korea Advanced Institute of Science and Technology, National University of Singapore; 2009, 4 pgs., Singapore; https://www-old.com.nus.edu.sg/~brown/pdf/icip09_defocus.pdf.

* cited by examiner

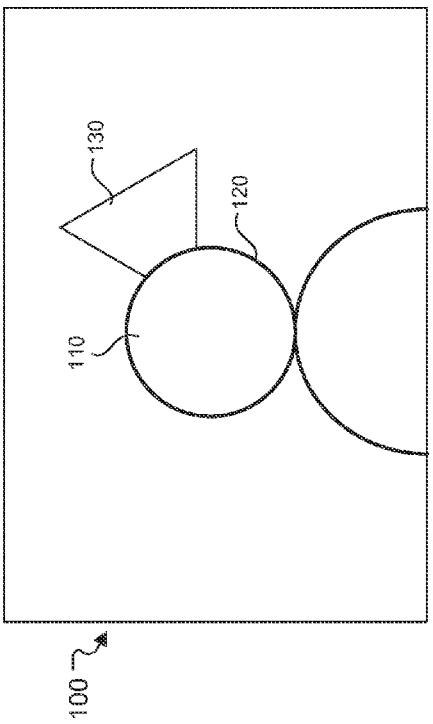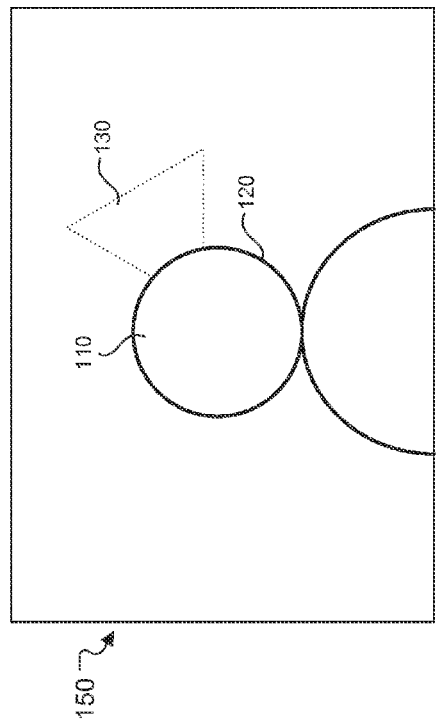

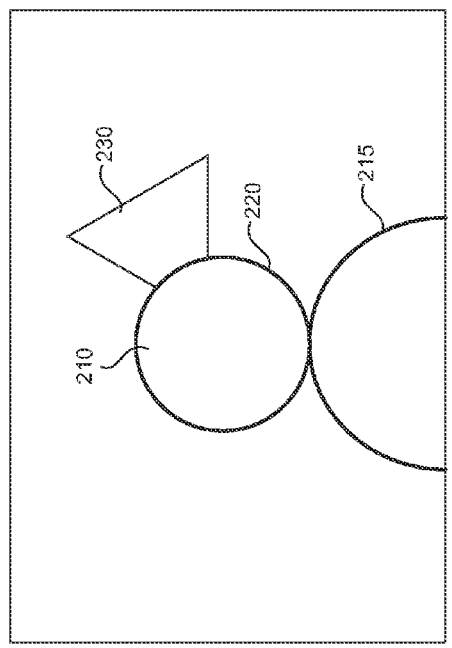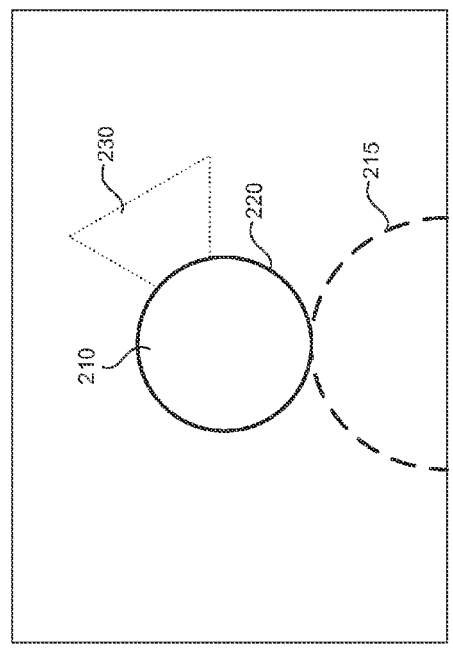

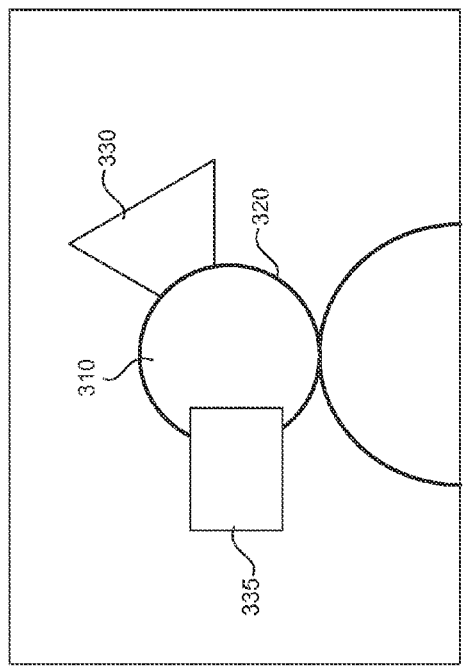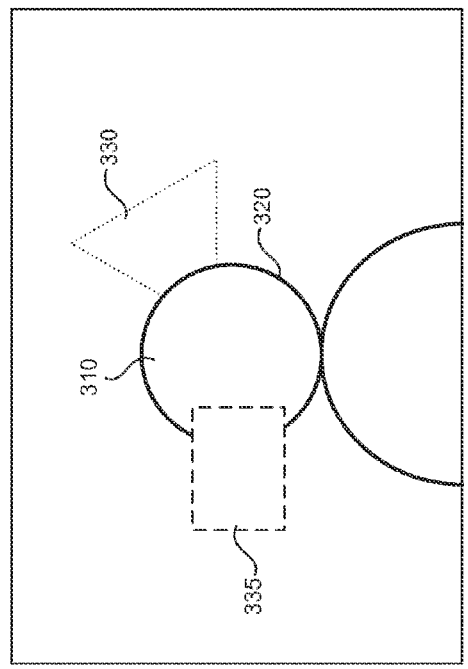

ACCURATE SIMULATION OF SHALLOW DEPTH OF FIELD USING CONTRAST DETECTION

BACKGROUND

The present disclosure relates generally to accurately simulating a shallow depth of field in an image.

In optics, in particular photography, a camera lens generally can precisely focus on only one distance at a time. Objects at this particular distance will produce a sharp image. Objects will appear more blurry as they are farther from this distance, either nearer or further from this distance. However, objects within a certain range of this distance, or depth of field (DOF), will appear acceptably sharp and in focus. A large depth of field will produce images with more objects in focus. A shallow depth of field will produce images with less objects in focus, or more blurry objects, when there are objects outside the minimum depth of field.

SUMMARY

Aspects of the subject technology relate to a method of accurately simulating shallow depth of field. The method includes detecting a highest contrast value in the image and determining one or more high contrast areas in the image, wherein the one or more high contrast areas are defined by adjacent portions of the image each having a contrast value within a threshold contrast value based on the highest contrast value. The method also includes determining one or more edges of the determined one or more high contrast areas, wherein portions of the image adjacent to at least one of the one or more edges and outside of the one or more high contrast areas each have a contrast value below the threshold contrast value. The method also includes applying a visual effect to the portions of the image adjacent to the determined one or more edges and outside of the determined one or more high contrast areas such that the visual effect is not applied to the one or more edges and not applied to the one or more high contrast areas.

Aspects of the subject technology also relate to a non-transitory machine-readable medium including instructions stored therein, which when executed by a machine, cause the machine to perform operations. The operations include determining an in-focus portion of an image based on a highest contrast value of the image, the in-focus portion bounded by an edge and determining an out-of-focus portion of the image based on the highest contrast value of the image, the edge forming a boundary between the in-focus portion and the out-of-focus portion. The operations also include detecting the edge based on the in-focus portion and the out-of-focus portion, and applying a visual effect to the out-of-focus portion such that the visual effect is not applied to the edge and not applied to the in-focus portion.

Aspects of the subject technology also relate to a system. The system includes one or more processors and a non-transitory computer-readable medium comprising instructions stored therein, which, when executed by the one or more processors, cause the one or more processors to perform operations. The operations include determining an in-focus portion of an image, the in-focus portion bounded by an edge and determining an out-of-focus portion of the image, the edge forming a boundary between the in-focus portion and the out-of-focus portion. The operations also include detecting the edge based on the in-focus portion and the out-of-focus portion, and applying a visual effect to the out-of-focus portion such that the visual effect is not applied to the edge and not applied to the in-focus portion.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

FIG. 1A illustrates an image according to example aspects of the present disclosure;

FIG. 1B illustrates the image of FIG. 1A after post-processing according to example aspects of the present disclosure;

FIG. 2A illustrates an image according to example aspects of the present disclosure;

FIG. 2B illustrates the image of FIG. 2A after post-processing according to example aspects of the present disclosure;

FIG. 3A illustrates an image according to example aspects of the present disclosure;

FIG. 3B illustrates the image of FIG. 3A after post-processing according to example aspects of the present disclosure;

DETAILED DESCRIPTION

Figure 4:
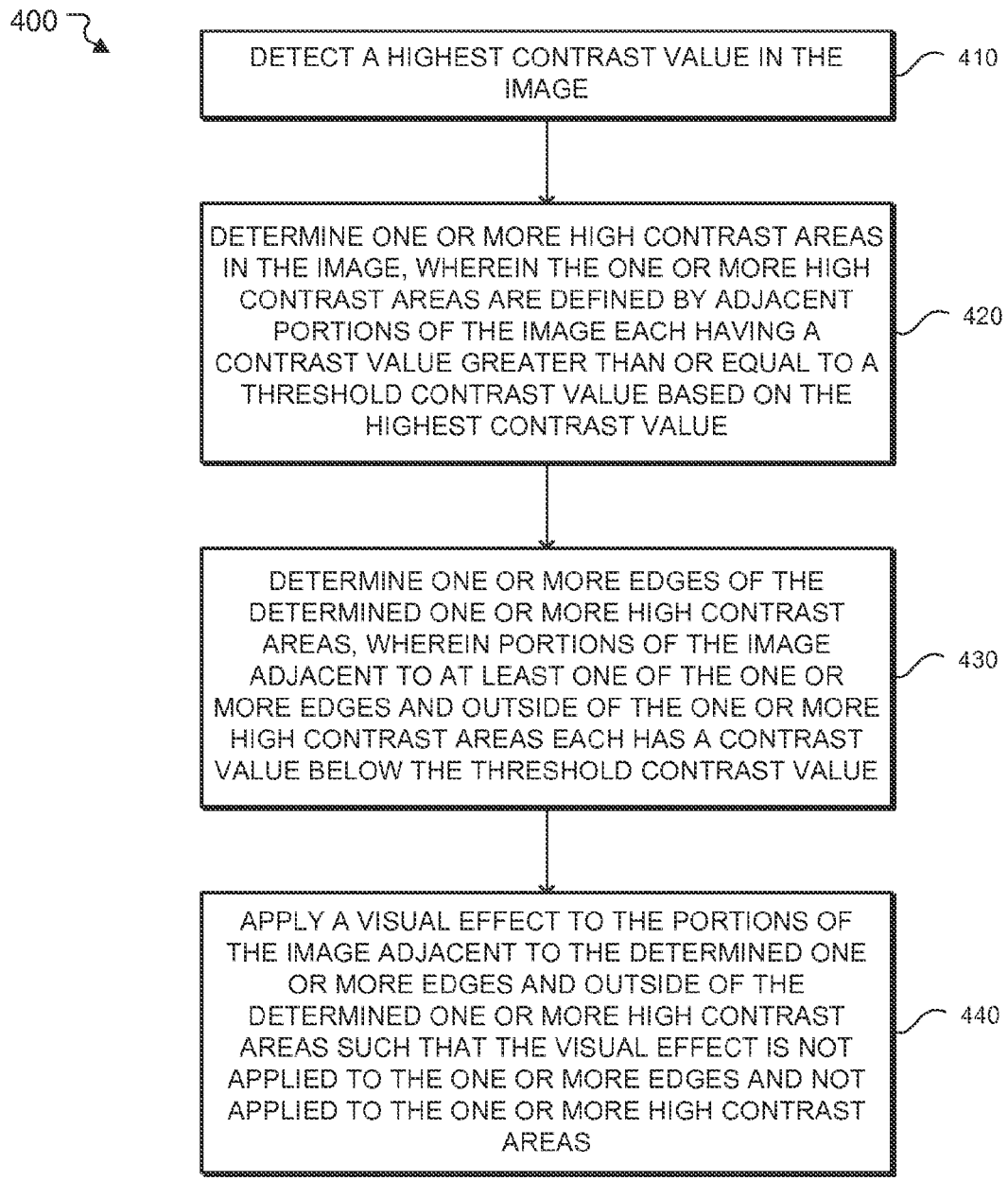
FIG. 4 is a flowchart illustrating a process for accurately simulating shallow depth of field using contrast detection according to example aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In photography, "bokeh" refers to an aesthetic quality of out-of-focus parts of an image which are blurred. For example, having the subject of the image appear sharp in the foreground and the background blurred may produce an aesthetically pleasing image. A camera and lens system with a shallow depth of field (DOF) can produce the bokeh effect. Such cameras generally require large lens apertures and large image sensors, which also tend to be expensive for consumers or non-professional photographers. Small cameras, such as smartphone cameras or point-and-shoot cameras, generally have larger depths of field and may be unable to produce significant bokeh.

In accordance with one or more implementations, methods and systems for accurately simulating a shallow DOF through post-processing an image are described. Using contrast detection, portions of the image that are more in focus, and portions that are less in focus can be estimated. Areas of the image having higher contrast may be identified as being more in focus, whereas areas having less contrast may be identified as being less in focus. Applying additional blurring to low contrast areas decreases the apparent DOF. The blurring can stop abruptly at the edges of high contrast areas, such as the subject of the image. Such discontinuities in blurring preserves clarity at the edges of the high contrast areas.

The shallow DOF may also be applied to videos, by treating each frame as an image. To improve the effect, a state may be saved between frames to keep track of which areas were blurred in the previous frame to prevent discrepancies from frame to frame, such as an area being blurred in one frame, and not blurred in the next frame. This discrepancy may occur when the area is near or crossing a threshold, such as a contrast threshold.

Alternatively, the in-focus and out-of-focus areas of the image can be determined from other information. Certain cameras may be capable of detecting phase difference. For instance, each pixel of the camera sensor may be two pixels which detect the phase difference of light entering the sensor. The phase difference can be used to determine areas that are less in focus, to apply additional blurring. In addition, face recognition may be used to detect faces in the image, which may be assumed to be in focus. The areas outside of the faces may then be blurred.

FIG. 1A shows an image 100 having a high contrast area 110 and a low contrast area 130. The high contrast area 110 is defined by an edge 120. The high contrast area 110 and the low contrast area 130 may be identified using contrast detection. The contrast detection may determine contrast values for all areas of the image 100. The highest contrast value in the image may be determined, and high contrast and low contrast may be determined based on the highest contrast value. For instance, a threshold contrast value may indicate contrast values at or above the threshold contrast value to be high contrast, and values below to be low contrast. The threshold contrast value may be determined based on the highest contrast value, such as a fractional value of the highest contrast value, a predetermined value below the highest contrast value, a value between the highest contrast value and a lowest contrast value, or the highest contrast value itself.

Areas having the highest contrast value may correspond to areas being the most in-focus. The high contrast areas may be identified by areas having contrast values at or above the threshold contrast value, such as the high contrast area 110. The low contrast areas may be identified by areas having contrast values below the threshold contrast value, such as the low contrast value 130. The high contrast area 110 may be bounded or defined by the edge 120. The edge 120 may be a line of high contrast, and may also abut or be immediately adjacent to low contrast areas, such as the low contrast area 130.

A shallow DOF can be simulated by blurring out-of-focus areas of the image 100. FIG. 1B shows an image 150, which may be the image 100 after post-processing. In FIG. 1B, the shallow DOF is simulated in the image 150 by blurring low contrast areas, including the low contrast area 130. The low contrast area 130 is blurred right up to the edge 120. The blurring stops abruptly at the edge 120. The edge 120 and the high contrast area 110 may not be blurred, resulting in a discontinuity in blurring at the edge 120. These discontinuities of blurring may preserve clarity at the edge 120, which may also cause the high contrast area 110 appear to stand out, and the low contrast area 130 appear to be less noticeable.

The blur may be a Gaussian blur, or other blur effects that may simulate bokeh or shallow DOF. The blur may be uniform across all areas of low contrast. The amount of blur may also change for different areas. For example, the blur may be a gradient from the areas of high contrast. The contrast values may be used to determine the amount of blur to apply. For instance, the magnitude of the contrast value may be related linearly to the magnitude of the blur effect applied. The contrast values may be compared to the highest contrast value to determine the magnitude of the blur effect. Alternatively, other visual effects, such as monochrome, may be applied instead of or in addition to the blurring. By applying other visual effects, other aesthetic effects may be achieved.

FIG. 2A shows an image 200 having a face area 210 and a non-face area 230. The face area 210 is defined by an edge 220. The face area 210 and the non-face area 230 may be identified using facial recognition. In certain implementations, a body area 215 may further be identified. The body area 215 is associated with the face area 210. When a photo of a person is taken, the person, particularly the person's face, is presumably going to be in focus. In the image 200, the face area 210 may correspond to an area being the most in-focus, and the non-face area 230 may correspond to an out-of-focus area. The body area 215 may also correspond to another in-focus area, or nearly in-focus, although in certain implementations it may be desirable to consider the body area 215 to be out-of-focus.

FIG. 2B shows an image 250, which may be the image 200 after post-processing. In FIG. 2B, the shallow DOF is simulated in the image 250 by blurring the non-face area 230. The non-face area 230 is blurred right up to the edge 220. The blurring stops abruptly at the edge 220. The edge 220 and the face area 210 may not be blurred, resulting in a discontinuity in blurring at the edge 220. These discontinuities of blurring may preserve clarity at the edge 220, which may also cause the face area 210 appear to stand out, and the non-face area 230 appear to be less noticeable. The body area 215 may not be blurred, such that the person shown by the face area 210 and the body area 215 appear to be in focus. In certain implementations, the body area 215 may also be blurred, which may further exaggerate the bokeh effect. The body area 215 may not be blurred as much as the non-face area 230.

FIG. 3A shows an image 300 having an in-focus area 310, a back focus area 330, and a front focus area 335. The in-focus area 310 is defined by an edge 320. The in-focus area 310, the back focus area 330, and the front focus area 335 may be identified using phase difference data. The image 300 may include or otherwise be associated with phase difference data. For instance, the image 300 may be saved in a format including raw phase difference data. In certain implementations, the image 300 may be associated with a memory storing phase difference data. For example the image 300 and the phase difference data may be stored on a memory of a digital camera. The phase difference data may be acquired by a camera having a phase difference sensor.

Using the phase difference data, portions of the image which are in focus, such as the in-focus area 310 may be more precisely determined. The phase difference data may further be used to determine how out-of-focus portions of the image are. In other words, the phase difference data may be used to determine how far away an object in the image is from a focus distance. The phase difference data may be used to determine objects which are in front of the focus distance and closer to the camera, and objects behind the focus distance or farther from the camera. Using the phase difference data, the back focus area 330 and the front focus area 335 may be determined. The back focus area 330 may be behind the in-focus area 310, and the front focus area 335 may be in front of the in-focus area 310.

FIG. 3B shows an image 350, which may be the image 300 after post-processing. In FIG. 3B, the shallow DOF is simulated in the image 350 by blurring at least the back focus area 330. The back focus area 330 is blurred right up to the edge 320. The blurring stops abruptly at the edge 320. The edge 320 and the in-focus area 310 may not be blurred, resulting in a discontinuity in blurring at the edge 320. These discontinuities of blurring may preserve clarity at the edge 320, which may also cause the in-focus area 310 appear to stand out, and the back focus area 330 appear to be less noticeable. The portions of the back focus area 330 may be blurred more based on the phase difference data. For example, the farther away the object is from the focus distance based on the phase difference data, the more it may be blurred. The front focus area 335 may also be blurred. The amount of blurring may also be based on the phase difference data. In certain implementations, only the back focus area 330 may be blurred, or only the front focus area may be blurred, depending on the desired result. In addition, although blurring is described, other visual effects may be applied. The magnitude of the other visual effects may also be based on the phase difference data.

FIG. 4 shows a flowchart 400 of a process of accurately simulating shallow DOF in an image, according to example aspects. At block 410, a highest contrast value in the image is detected. At block 420, one or more high contrast areas in the image are determined. The one or more high contrast areas are defined by adjacent portions of the image each having a contrast value within a threshold contrast value based on the highest contrast value. Thus, high contrast areas may have similar contrast values but do not require a consistent contrast value throughout.

At block 430, one or more edges of the one or more high contrast areas are determined. Portions of the image adjacent to at least one of the one or more edges and outside of the one or more high contrast areas each have a contrast value below the threshold contrast value. In other words, low contrast areas may be determined, based on the threshold contrast value. The one or more edges form a boundary between high contrast areas and low contrast areas.

At block 440, a visual effect is applied to the portions of the image adjacent to the determined one or more edges and outside of the determined one or more high contrast areas such that the visual effect is not applied to the one or more edges. For example, blurring may be applied to the low contrast areas and stop abruptly at the edges to create a blurring discontinuity.

Figure 5:
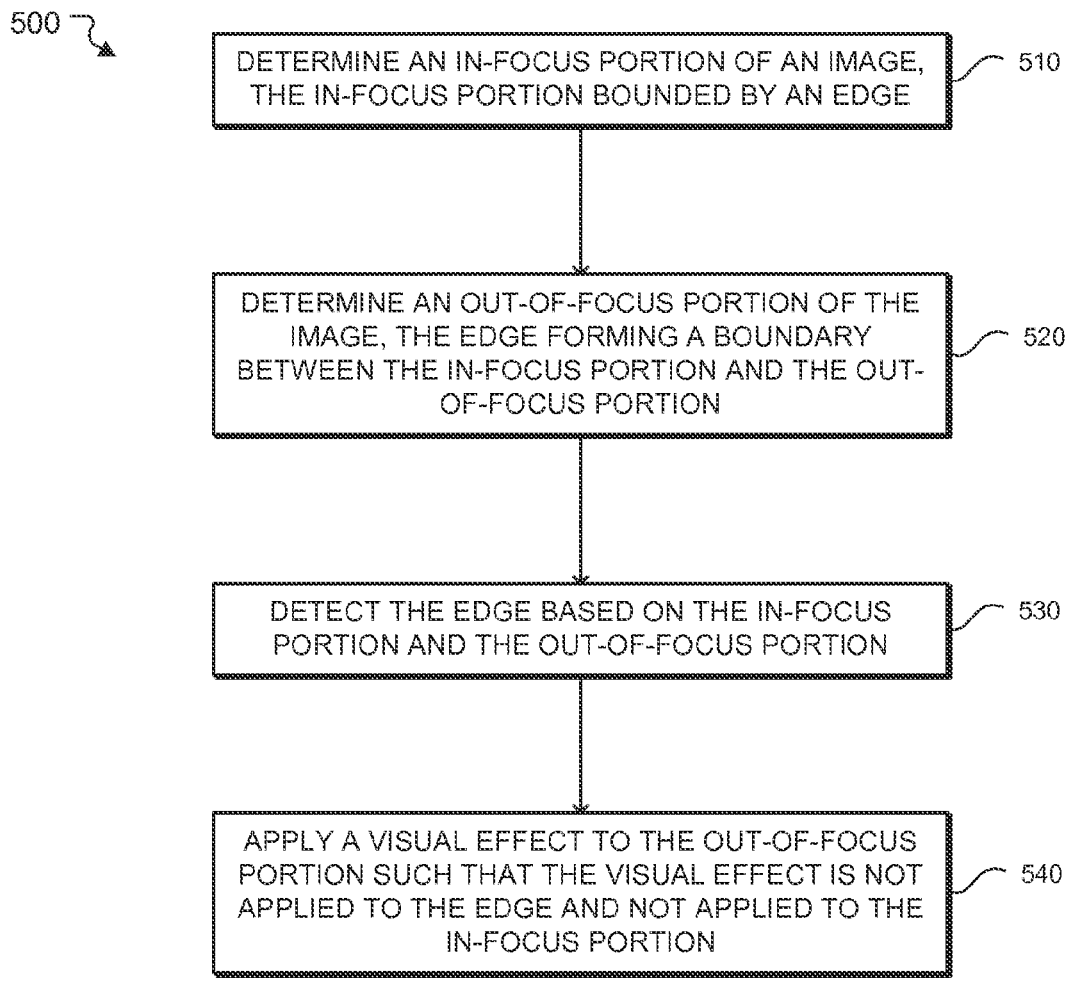
FIG. 5 is a flowchart illustrating a process for simulating shallow depth of field according to example aspects of the present disclosure.

FIG. 5 shows a flowchart 500 of a process for accurately simulating shallow DOF in an image according to example aspects. At block 510, an in-focus portion of the image is determined. The in-focus portion is bounded by an edge. At block 520, an out-of-focus portion of the image is determined. The edge forms a boundary between the in-focus portion and the out-of-focus portion. At block 530, the edge is detected based on the in-focus portion and the out-of-focus portion. At block 540, a visual effect is applied to the out-of-focus portion such that the visual effect is not applied to the edge and not applied to the in-focus portion.

Figure 6:
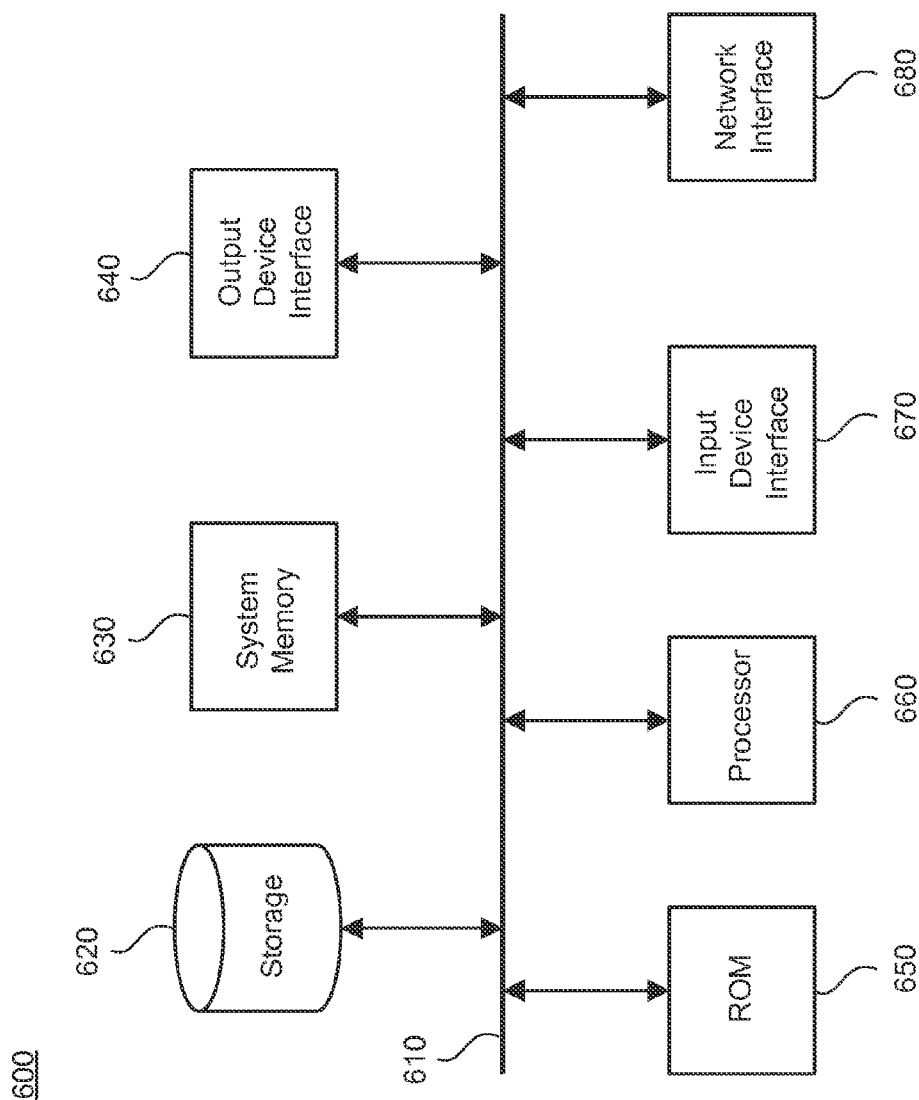
FIG. 6 shows a diagram of an electronic system according to example aspects of the present disclosure.

FIG. 6 conceptually illustrates an example electronic system with which some implementations of the subject technology can be implemented. Electronic system 600 can be a computer, phone, PDA, or any other sort of electronic device such as a digital camera. Such an electronic system includes various types of computer readable media and interfaces for various other types of computer readable media. Electronic system 600 includes a bus 610, processing unit(s) 660, a system memory 630, a read-only memory (ROM) 650, a permanent storage device 630, an input device interface 670, an output device interface 640, and a network interface 680.

Bus 610 collectively represents all system, peripheral, and chipset buses that communicatively connect the numerous internal devices of electronic system 600. For instance, bus 610 communicatively connects processing unit(s) 660 with ROM 650, system memory 630, and permanent storage device 620.

From these various memory units, processing unit(s) 660 retrieves instructions to execute and data to process in order to execute the processes of the subject disclosure. The processing unit(s) can be a single processor or a multi-core processor in different implementations.

ROM 650 stores static data and instructions that are needed by processing unit(s) 660 and other modules of the electronic system. Permanent storage device 620, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 620.

Other implementations use a removable storage device (for example, a floppy disk, flash drive, and its corresponding disk drive) as permanent storage device 620. Like permanent storage device 620, system memory 630 is a read-and-write memory device. However, unlike storage device 620, system memory 630 is a volatile read-and-write memory, such as a random access memory. System memory 630 stores some of the instructions and data that the processor needs at runtime. In some implementations, the processes of the subject disclosure are stored in system memory 630, permanent storage device 620, or ROM 650. For example, the various memory units include instructions for simulating a shallow DOF in an image through post-processing. From these various memory units, processing unit(s) 660 retrieves instructions to execute and data to process in order to execute the processes of some implementations.

Bus 610 also connects to input and output device interfaces 670 and 640. Input device interface 670 enables the user to communicate information and select commands to the electronic system. Input devices used with input device interface 670 include, for example, alphanumeric keyboards and pointing devices (also called "cursor control devices"). Output device interfaces 640 enables, for example, the display of images generated by the electronic system 600. Output devices used with output device interface 640 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 610 also couples electronic system 600 to a network (not shown) through a network interface 680. In this manner, the computer can be a part of a network of computers (for example, a local area network (LAN), a wide area network (WAN), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method comprising:
   detecting a highest contrast value in an image;
   determining one or more high contrast areas in the image, wherein the one or more high contrast areas are defined by adjacent portions of the image each having a contrast value greater than or equal to a threshold contrast value based on the highest contrast value;
   determining one or more edges of the determined one or more high contrast areas, wherein portions of the image adjacent to at least one of the one or more edges and outside of the one or more high contrast areas each has a contrast value below the threshold contrast value and wherein the portions of the image adjacent to the determined one of the one or more edges and outside of the determined one or more high contrast areas include a front focus area determined to be in front of at least one of the one or more high contrast areas and a back focus area determined to be behind the at least one of the one or more high contrast areas; and
   applying a visual effect to the portions of the image adjacent to the determined one or more edges and outside of the determined one or more high contrast areas such that the visual effect is not applied to the one or more edges and not applied to the one or more high contrast areas.

2. The method of claim 1, wherein the visual effect is a blur effect.

3. The method of claim 1, wherein the visual effect is applied based on comparing contrast values associated with the portions of the image adjacent to the determined one or more edges and outside of the determined one or more high contrast areas to the highest contrast value.

4. The method of claim 1, wherein a magnitude of the visual effect applied is based on a magnitude of each contrast value below the threshold contrast value.

5. The method of claim 1, wherein the visual effect is applied to simulate a bokeh effect.

6. The method of claim 1, further comprising:
   detecting a face in the image; and
   responsive to detecting the face, applying the visual effect to portions of the image outside of the detected face.

7. The method of claim 1, further comprising:
   determining phase difference data;
   responsive to determining the phase difference data, determining out-of-focus portions of the image utilizing the phase difference data; and
   applying the visual effect to the determined out-of-focus portions of the image.

8. A non-transitory machine-readable medium comprising instructions stored therein, which when executed by a machine, cause the machine to perform operations comprising:
   determining an in-focus portion of an image based on a highest contrast value of the image, the in-focus portion bounded by an edge;
   determining an out-of-focus portion of the image based on the highest contrast value of the image, the edge forming a boundary between the in-focus portion and the out-of-focus portion;
   determining a front focus area in front of the in-focus portion;
   determining a back focus area determined to be behind the in-focus portion:
   detecting the edge based on the in-focus portion and the out-of-focus portion;
   applying a visual effect to the out-of-focus portion such that the visual effect is not applied to the edge and not applied to the in-focus portion;
   applying the visual effect to the front focus area; and
   applying the visual effect to the back focus area, wherein a magnitude of the visual effect applied to the back focus area is different from a magnitude of the visual effect applied to the front focus area.

9. The non-transitory machine-readable medium of claim 8, wherein determining the in-focus portion further comprises detecting a face in the image, wherein the face corresponds to the in-focus portion.

10. The non-transitory machine-readable medium of claim 8, wherein determining the in-focus portion further comprises detecting the in-focus portion based on phase difference data.

11. The non-transitory machine-readable medium of claim 8, wherein the visual effect is a blur effect capable of simulating a bokeh effect.

12. The non-transitory machine-readable medium of claim 8, wherein a magnitude of the visual effect applied to the out-of-focus portion is based on a magnitude of a contrast value associated with the out-of-focus portion.

13. The non-transitory machine-readable medium of claim 8, wherein a magnitude of the visual effect applied to the out-of-focus portion is based on a magnitude of a phase difference associated with the out-of-focus portion.

14. A system comprising:
one or more processors; and
a non-transitory machine-readable medium comprising instructions stored therein, which when executed by a machine, cause the machine to perform operations comprising:
determining an in-focus portion of an image, the in-focus portion bounded by an edge;
determining an out-of-focus portion of the image, the edge forming a boundary between the in-focus portion and the out-of-focus portion, the out-of-focus portion including a front focus area determined to be in front of the in-focus portion and a back focus area determined to be behind the in-focus portion;
detecting the edge based on the in-focus portion and the out-of-focus portion; and
applying a visual effect to the out-of-focus portion such that the visual effect is not applied to the edge and not applied to the in-focus portion.

15. The system of claim 14, wherein determining the in-focus portion further comprises:

detecting a highest contrast value in the image; and
determining a high contrast area in the image, wherein the high contrast area is defined by adjacent portions of the image each having a contrast value within a threshold contrast value based on the highest contrast value, and wherein the high contrast area corresponds to the in-focus portion.

16. The system of claim 15, wherein determining the out-of-focus portion further comprises determining a low contrast area in the image, wherein the low contrast area is defined by portions of the image having a contrast value below the threshold contrast value.

17. The system of claim 14, wherein determining the in-focus portion further comprises detecting a face in the image, wherein the face corresponds to the in-focus portion.

18. The system of claim 14, further comprising a memory configured to store the image and phase difference data associated with the image, wherein determining the in-focus portion further comprises detecting the in-focus portion based on the phase difference data.

19. The system of claim 14,
wherein a magnitude of the visual effect applied to the back focus area is different from a magnitude of the visual effect applied to the front focus area.

20. The system of claim 18, wherein a magnitude of the visual effect applied is based on a magnitude of a phase difference associated with the out-of-focus portion.

* * * * *